United States Patent [19]
Polidoro et al.

[11] Patent Number: 5,768,137
[45] Date of Patent: Jun. 16, 1998

[54] LASER ALIGNED ROBOTIC MACHINING SYSTEM FOR USE IN REBUILDING HEAVY MACHINERY

[75] Inventors: Roger J. Polidoro, Christiansburg; Henry M. Bass, Radford; Russell J. Churchill, Radford; Bruce L. Thomas, Radford; Lloyd K. Loftus, Radford, all of Va.

[73] Assignees: American Research Corporation of Virginia, Radford; Eastern Repair Fabrication, Christiansburg, both of Va.

[21] Appl. No.: 421,008

[22] Filed: Apr. 12, 1995

[51] Int. Cl.$^6$ .............................. G06F 19/00; G06G 7/64; G06G 7/66
[52] U.S. Cl. .............................. 364/474.28; 364/474.17; 382/152
[58] Field of Search ................ 364/474.28, 474.01, 364/474.02, 474.17, 474.34, 474.16, 474.09, 474.19; 356/139.03, 138, 152.1, 139.1, 141.4, 400; 82/117, 118; 228/102; 409/178, 174, 179, 185, 193, 204, 207; 382/108, 152

[56] References Cited

U.S. PATENT DOCUMENTS

| | | | |
|---|---|---|---|
| 4,712,953 | 12/1987 | Witzel et al. | |
| 4,792,228 | 12/1988 | Haffner | 356/138 |
| 4,824,007 | 4/1989 | Depaoli et al. | 228/102 |
| 4,947,910 | 8/1990 | Reneav | 144/371 |
| 4,966,460 | 10/1990 | Kahley | |
| 4,995,087 | 2/1991 | Rathi et al. | 382/152 |
| 5,044,844 | 9/1991 | Backhouse | |
| 5,095,787 | 3/1992 | Leroux et al. | 82/118 |
| 5,106,243 | 4/1992 | Hunt | 409/178 |
| 5,148,232 | 9/1992 | Duey et al. | |
| 5,204,734 | 4/1993 | Cohen et al. | 382/108 |
| 5,240,359 | 8/1993 | Backhouse | 409/178 |
| 5,255,199 | 10/1993 | Barkman et al. | 364/474.17 |
| 5,302,833 | 4/1994 | Hamar et al. | 250/561 |
| 5,311,784 | 5/1994 | Girard et al. | 364/474.17 |

OTHER PUBLICATIONS

Assn for Manufacturing Technology (AMT), *The Economic Handbook of the Machine Tool Industry*, p. C-10, (USA 1993-1994).

Advertisement of *Models CPM820, CPM848 & CPM 878*, Climax Portable Machine Tools, Inc., 1-page advertisement, Jan. 1994.

(List continued on next page.)

*Primary Examiner*—Reba I. Elmore
*Assistant Examiner*—Sheela S. Rao
*Attorney, Agent, or Firm*—James Creighton Wray; Meera P. Narasimhan

[57] ABSTRACT

A precision positioning system is used for resurfacing and repairing rails and guideways of large, heavy machinery at users facilities. The system has new components, an entire machining system, a new alignment system, parallel platforms for tool support and surface scanning. A sectioned, portable monorail frame is held by fixed supports at the locus of a heavy machine requiring guideway straightening. Fixed guides extend along the outer surface of the monorail. Guide wheels and drive wheels contact the guides and support and move an outer tubular beam carriage. An assembly of machining tools is adjustably positioned on the carriage. Laser alignment sources and sensors are connected to the carriage and to heavy machines off-axis and parallel to the monorail. Intelligent controls precisely position the tools for resurfacing the rails and guideways. Scanning and a printout of machine guideway accuracy, before and after the operation, provide written verification of quality improvement. The system increases accuracy and speed of machining, reduces chatter and vibration, eliminates imprecise manual determinations, and returns the equipment to acceptable improved tolerances. The system has applications in any machine tool rebuilder or company with a machine tool in need of requalification. Applications also include rail transport, autonomous vehicles, micromachining, inspection camera positioning, laser machining, material deposition and other operations such as drilling, heat treating, brazing and welding.

28 Claims, 12 Drawing Sheets

OTHER PUBLICATIONS

Earl Cox, Adaptive Fuzzy Systems, IEEE Spectrum, pp. 27–31, Feb. 1993.

John T. Dorsey, "Vibration Characteristics . . . ", NASA Technical Paper 2160, pp. 1–26, Jun. 1983.

E.F. Fichter, "A Stewart Platform–Based Manipulator . . . ", Int'l Journal of Robotics Research, pp. 157–182, Summer 1985.

Luxon et al., "Industrial Lasers and Their Applications", 2nd. Ed., Prectice–Hall, pp. 80–83, 161–203, New Jersey 1992.

*Building a Case for Rebuilding,* Manufacturing Engineering, pp. 62–64, May 1991.

McCulloch et al., "A Logical Calculus . . . ", Bulletin of Mathematical Biophysics, pp. 115–133, 1943.

Rhodes et al., "Deployable Controllable Geometry Truss Beam", NASA Technical Memorandum 86366, pp. 1–15, Jun. 1985.

Eugene Sprow, "The Mechanics of Remanufacture", Manufacturing Engineering, pp. 38–45, Mar. 1992.

Robert N. Stauffer, "Making the Right Moves in Machine Make–Over", Manufacturing Engineering, pp. 49–53, Mar. 1990.

Tidwell et al., "Kinematic Analysis of Generalized Adaptive Trusses", 1st Joint US/Japan Conf. on Adaptive Struct., Maui, HI, Nov. 13–15, 1990, pp. 772–791.

U.S. Department of Commerce, "U.S. Industrial Outlook", Jan. 1993, p. 16–2.

Mamdani et al., "An Experiment in Linguistic Synthesis . . . " Academic Press, pp. 311–323 (N.Y. 1981).

Robert J. Salerno, "Historical Development of VGT's", presented at various conferences (Blacksburg, Virginia, Jan. 1992).

D. Stewart, "A Platform with Six Degrees of Freedom", Proceedings of the Institute of Mech. Eng. , vol. 180, Part I, No. 15 pp. 371–386 (London 1966).

L.A. Zadeh, "Fuzzy Sets", Information and Control, vol. 8, No. 3, pp. 338–353 (Jun. 1965).

VanLandingham et al., "Application of Fuzzy Logic Control . . . ", Proc. of 1992 International Fuzzy Systems and Intelligence Control Conference, Louisville, Kentucky, pp. 8–17 (1992).

Posey et al., "Fuzzy Hybrid Systems", Hybrid Architectures for Intelligent Systems, CRC Press, Boca Raton (1992).

Bursanescu et al., "Laser System for High Accuracy Alignment and Positioning", Rev. Sci. Intrum. pp. 1686–1690 (May 1994).

Daghigian "Optical Position Sensing with Duolateral Photoeffect Diodes", Sensors, pp. 31–32, 34, 37–39 (Nov. 1994).

Wu, "Development of New Techniques . . . ", Final Report to USAF Wright Lab Tech. Directorate, Report No. WL–TR–92–8015 (Apr. 1992).

"Alignment at Laser Speed", Hamar Laser Instruments, Inc. Advertisement, Copyright 1990.

"Machine Tool Alignment Packages . . . ", Hamar Laser Instruments, Inc. brochure, Copyright 1994.

"Coupling II–The Complete Coupling Alignment System", Hamar Laser Instruments, Inc. brochure, Copyright 1994.

"The Model L–723 Triple Scan Laser", Hamar Laser Instruments, Inc. brochure, Copyright 1992.

"Digital Positioning Sensing Detectors", EG&G Heimann Optoelectronics brochure and specifications, undated.

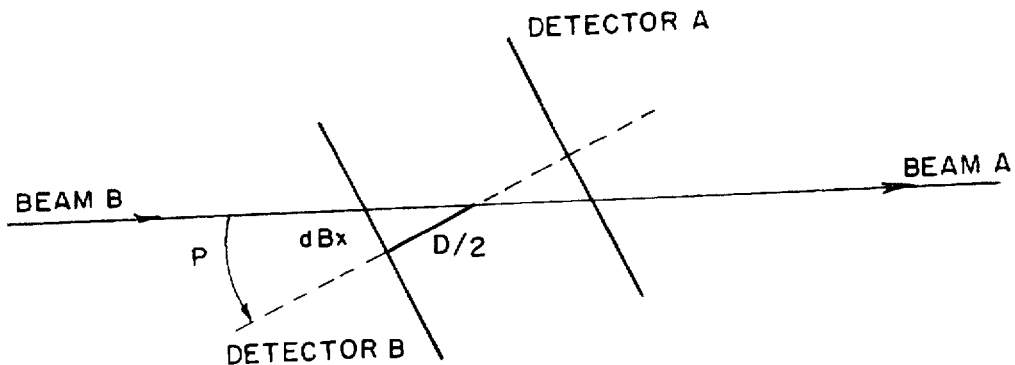

$dA_x \equiv$ RELATIVE CHANGE IN X-POSITION AT DETECTOR A
$dB_x \equiv$ RELATIVE CHANGE IN X-POSITION AT DETECTOR B
$D \equiv$ DISTANCE BETWEEN PARALLEL DETECTOR PLANES (CONSTANT)

$$P = \left[ \frac{\tan^{-1}\left(\frac{2dB_x}{D}\right) - \tan^{-1}\left(\frac{2dA_x}{D}\right)}{2} \right]$$

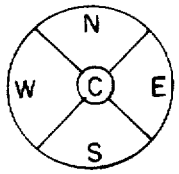

| MACHINE DEFLECTION | SPOT LOCATION | | | | QUADRANT SIGNAL | | | |
|---|---|---|---|---|---|---|---|---|
| | $S_1$ | $S_2$ | $S_3$ | $S_4$ | $S_1$ | $S_2$ | $S_3$ | $S_4$ |
| NO DEFLECTION | ⊙ | ⊙ | ⊙ | ⊙ | C | C | C | C |
| X+ | ⊙ | ⊙ | ⊙ | ⊙ | S | S | S | S |
| Y+ | ⊙ | ⊙ | ⊙ | ⊙ | E | W | E | W |
| X TWIST + | ⊙ | ⊙ | ⊙ | ⊙ | W | W | W | W |
| Y TWIST + | ⊙ | ⊙ | ⊙ | ⊙ | S | N | S | N |
| Z TWIST + | ⊙ | ⊙ | ⊙ | ⊙ | N | N | S | S |
| Z +/− | UNCHANGED | | | | UNCHANGED | | | |

LASER ALIGNED ROBOTIC MACHINING SYSTEM FOR USE IN REBUILDING HEAVY MACHINERY

BACKGROUND OF THE INVENTION

This invention relates to industrial metal-cutting machine tools, robotics, precision positioning, and laser alignment.

Needs exist for automated, transportable machines capable of resurfacing the rails and guideways of large industrial lathes, mills, grinders and other machine tools. When heavy equipment can no longer perform within acceptable standards, either due to wear over time or to a machining accident, the equipment must be repaired or replaced, neither of which may be an attractive option. Currently, the market for rebuilt machinery offers great potential. Machine tools built and purchased during the economic expansions between 1950 and 1970 are now deteriorating. In the 1980's, many U.S. machine tool manufacturers ceased to exist, thereby forcing most replacement machinery to come from foreign sources. In efforts to minimize costs, maximize productivity, and increase quality, machine tool owners have turned toward rebuilding or remanufacturing existing machinery instead of purchasing new tools. Rebuilding and remanufacturing costs 40–60% less than new equipment, and rebuilt machines can often be placed back in service faster than new machines can be delivered. Older machines have heavier castings and more rugged weldments than modern equipment, making the machines stronger and more resistant to problems. Castings on older machines are fully stress relieved, making the machines more dimensionally stable. A remanufactured and retrofitted machine is as accurate as it was when new, and the machine's capability can be extended to deliver more versatile operation. Remanufacturing reduces costs by saving the original foundation, tooling, fixtures, cams and programs, and by retaining existing customization enhancements. An additional benefit recognized by restoring equipment is the minimization of maintenance and retraining of employees since machinists are already familiar with the restored equipment.

Location, ancillary equipment such as dust collection, material handling, and piping for air, electricity and water have created needs for systems capable of requalifying equipment in place. Sending equipment away or purchasing new machines costs production time and increases compatibility problems with existing equipment and features. Moving heavy machinery is expensive and may be impractical due to structural changes or installation of neighboring machines.

Existing rebuilding and remanufacturing systems are time consuming and expensive. Many domestic machine shops rebuild machinery, but require the removal of the equipment and the transporting of the machinery to the rebuilding facility, all at a considerable expense to the owner. Alternatively, the rails and guideways can be requalified on location by hand. That process, in which skilled machinists manually scrape, grind and check the surfaces and dimensions of the rails and guideways, is slow, iterative and has limited success.

Existing on-site methods and apparatus for rail and guideway milling are time consuming. Portable milling machines are limited in length, have little or no automation, and have relatively low tolerances. Hand wayscraping is an entirely manual process that is inefficient, very labor intensive, and may result in non-parallel rails and platens with poor bearing area surfaces. The current technique requires alignment of a parallel track for remachining. Techniques for gaging include using a suspended wire with known sag and then employing micrometers for measuring surface-to-wire height and to correct for wire sag, or using precision levels to align one track to the other. Needs exist for remachining systems that operate faster, are more accurate, and are less skilled-labor intensive than existing techniques.

The need for significant innovation in machine tool rebuilding and remanufacturing is evident from statistics showing an increasing amount of foreign machine tool purchases. The acceptance of remanufacturing services is constrained by the labor-intensive process, machine downtime and costs. Needs exist for remanufacturing systems that offer greater advantages over replacement and that give industry overwhelming incentives to repair and reconstruct existing machines.

Needs exist for more automated machining systems that can be easily transported, assembled and aligned and that repair the machines to original tolerance conditions or better.

SUMMARY OF THE INVENTION

The present invention is a portable laser aligned robotic positioning system designed to resurface the guideways of large, heavy machinery and return the units to acceptable or improved tolerances. The system automates the requalifying process for large metalworking machinery. Proper deployment of the present invention consists of assembling multiple monorail frame sections, making an initial traversal of the monorail to align the machine tool with datums chosen near each end of the machine bed, traversing a monorail a second time to scan the bed to be machined, recording existing conditions, machining the bed-rails and guideways, and traversing the monorail a final time to verify and record the accuracy of the machining process and the restoration. Many critical positioning applications other than machining will also benefit from the precision positioning system, including operations related to rail transport, autonomous materials handling vehicles, and robotic workstations. The present invention has potential uses in assembly operations, docking maneuvers, micromachining on a smaller scale, laser machining, material deposition, and inspection camera positioning. Besides grinding and milling, a variety of tools can be incorporated for performing operations such as drilling, heat treating, brazing and welding.

The laser aligned robotic positioning system has six subassemblies, including a machine tool head, a laser alignment system, a parallel platform tool positioner, an intelligent controller, an imaging system, and a sectioned monorail frame. The present invention integrates several emerging technologies in the fields of laser measurement, intelligent control, robotics and machine design. The system provides a suspended monorail with parallel guiderails that allow a carriage/tool platform to traverse longitudinally while being guided by laser beams. Optical alignment techniques permit gravitational effects to be ignored. The laser aligned remachining of the present invention incorporates parallel platform technology for tool motion and intelligent control. The sectional monorail allows the machine to be easily transported to and assembled at the repair site. The advanced alignment system creates accurate cutting and grinding and increases control. Incorporation of intelligent control strategies reduces machine chatter and vibration.

Laser aligned robotic machining is efficient and precise. Operational characteristics possibly include laser position measurements to 30 millionths of an inch, controller processing at 10 MegaHertz, a parallel platform with a two cubic inch work envelope, a rigid monorail with a first natural frequency above 200 Hertz, imaging accuracy to 100 millionths of an inch, and milling accuracy to +/–250 millionths of an inch per foot, non-cumulative. The laser alignment system of the present invention has two parallel beams and four detectors. That alignment provides for position monitoring in five axes, including two translational axes, X and y, and three rotational axes, pitch, roll and yaw. The laser alignment system, implemented with control software, can be added to existing machines to improve positioning resolution. Current add-ons for the same purpose typically use linear velocity transducers, optical interference patterns or servo positioning. Laser alignment offers solid state, wear-free components, with potentially an order of magnitude resolution improvement. Additionally, the problems of interferometry are avoided, namely changes in the index of light refraction due to pressure, humidity and temperature.

The intelligent control system incorporates elements of fuzzy logic, neural networks, learning in an expert environment, and innovative chatter and vibration control. The controller is based on linear control algorithms, supplemented by fuzzy logic for intelligence. Intelligent control, either retrofitted to existing CNC machinery or incorporated in a new machine, offers the user faster response, improved tool path planning, and a new level of chatter control. The ability of intelligent control to handle nonlinear systems allows for improvement over present PID or other control strategies in machine tools. As with laser aligning, many critical positioning applications can benefit from modifications of the intelligent control system, including those involving robotics, both serial and parallel manipulators, where algorithms quickly become complex, nonlinear and possibly singular.

Unlike traditional gantry or slideway configurations, the parallel platform tool positioning mechanism of the present invention offers a more compact and rigid form of locomotion.

The present invention not only addresses the problem of workpiece and tooling errors with an automated resurfacing machine, but also incorporates intelligent controls designed to reduce or eliminate both quasi-static and dynamic machine tool errors. The laser alignment system and imaging components employ technologies relevant to advanced metrology for precision tool positioning.

The laser aligned robotic positioning system makes it possible to requalify large machinery at the user's facility in an automated process. Additionally, the invention permits recording, printout and comparing of machine guideway accuracy before and after the operation to provide records and written verification of quality improvement. The system is useful to any machine tool rebuilder, to the United States Government, and to any company with a machine tool in need of requalification. Machine shops, particularly in the military components, will benefit from automated requalifying techniques at the depot or direct support level of maintenance. The present invention greatly enhances the machine tool market. An increase in machine tool remanufacturing will not only save billions of dollars for domestic manufacturers, but also will provide domestic jobs and will prevent billions of dollars from going overseas to foreign machine tool suppliers. Automated requalification offers many advantages when compared with current remachining practices. Improved accuracy, precision and efficiency, as well as real time verification of the improvement at a reduced cost, fully justify automation of the requalifying procedure.

These and other objects and features of the invention are apparent in the disclosure, which includes the above and ongoing written specification, with the claims and the drawings.

BRIEF DESCRIPTION OF THE DRAWINGS

FIG. 9 shows how x-y detector geometry is used to resolve angular displacements.

FIG. 10 shows laser spot location for motion in each axis.

DETAILED DESCRIPTION OF THE PREFERRED EMBODIMENTS

Figure 1A:
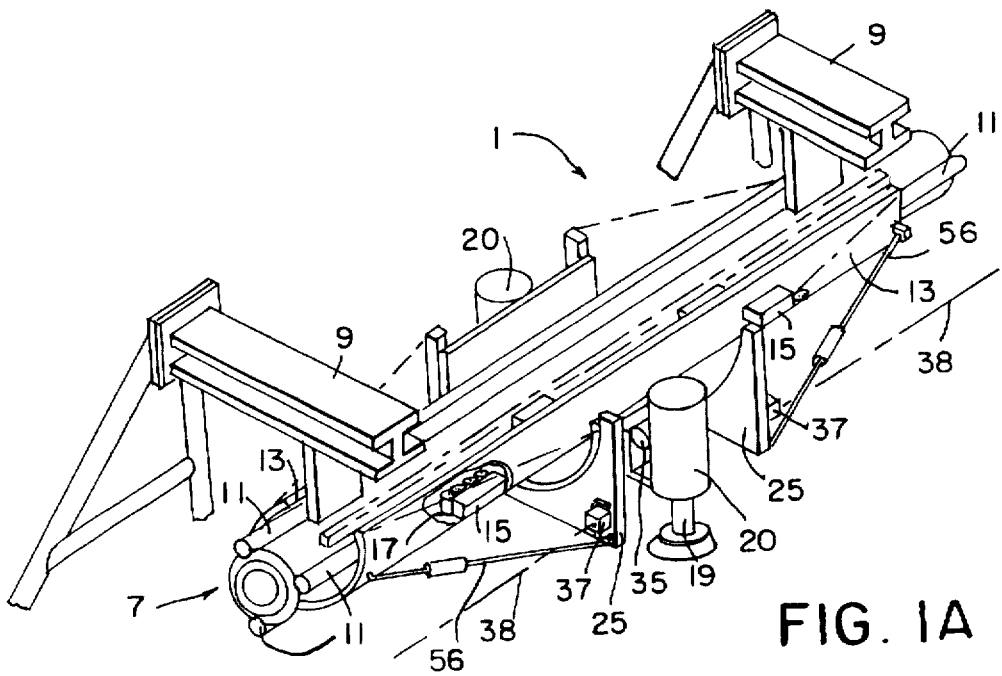
FIG. 1A is an isometric conceptual design view of the laser aligned robotic positioning system.
Figure 1B:
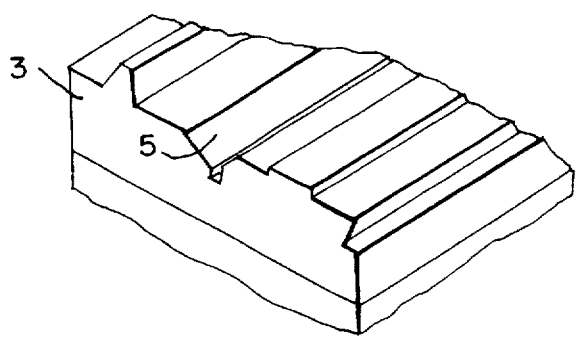
FIG. 1B is an exemplary detail of machine beds rails and guideways.
Figure 7:
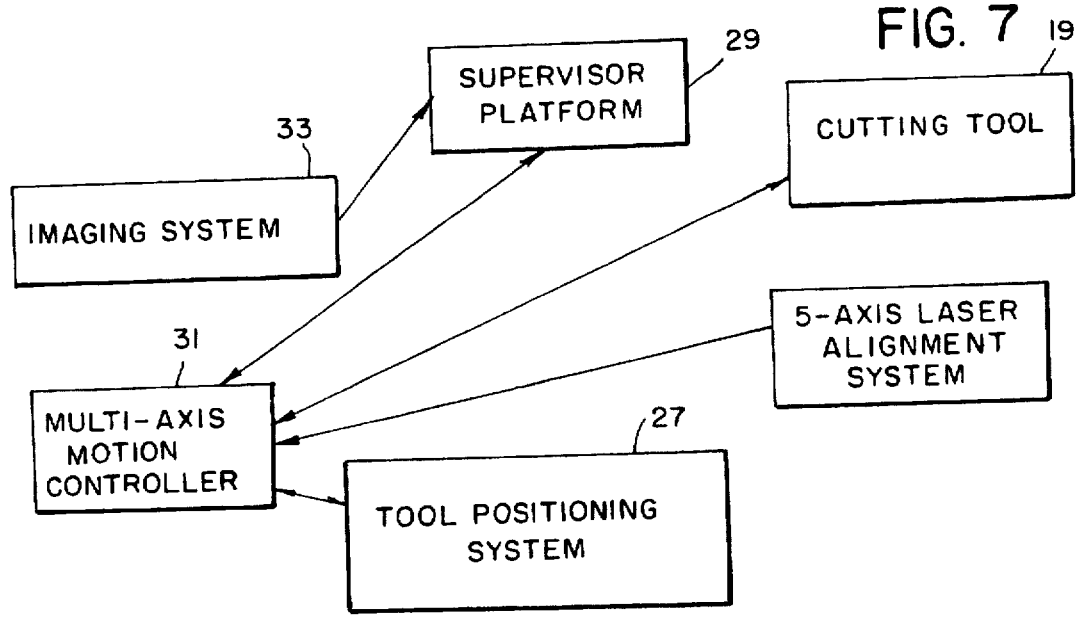
FIG. 7 is a schematic illustration of the present invention showing the interrelationship between the subassemblies.

Referring to the drawings and to FIGS. 1A, 1B and 7, the present invention is a laser aligned robotic positioning system 1. In one embodiment, the system 1 is used for resurfacing the rails 3 and guideways 5 of heavy machinery. Six subassemblies make up the system, including a machine tool platform 25, a laser alignment tool positioning system 27, a supervisor parallel platform tool positioner 29, an intelligent controller 31, an imaging system 33, and a monorail frame 7. FIG. 7 shows the interrelationships between the subassemblies of the present invention. The supervisor platform 29 sends and receives signals of control for the machine tool platform 25 and sends and receives signals to and from the imaging system 33. The supervisor platform 29 sends command signals to the intelligent controller 31, which controls the tool positioning system 27, which controls actuators. Position feedback from actuators, accelerometer measurements, and laser position signals are provided to controller 31 and the supervisor platform 29. By incorporating and synthesizing state of the art technologies, the system provides for efficient and precise machining.

The system 1, as shown in FIGS. 1A and 1B, has a sectioned, portable monorail frame 7 held by fixed supports 9. Multiple fixed guides 11 extend along the outer surface of the monorail 7. A movable carriage 13 surrounds the monorail 7. Linear bearings assemblies 15 have guide wheels 17 or guide bushings. The wheels 17 roll along the guides 11 and support the movable sled 13. An assembly of tools 19 are adjustably positioned on a machine tool platform 25. Laser alignment light sources 23 and detectors 37 (FIG. 8(a), FIG. 8(b)) are used by an intelligent controller 31 to position the tools 19 for resurfacing the rails 3 and guideways 5.

The automated positioning system 1 is laser guided for position resolution, monorail supported for portability, parallel platform actuated for positioning accuracy, computer controlled for intelligent sequencing, and fitted with position transducers for guideway imaging. Each subassembly is individually assembled and monitored for maximizing system potential.

In one embodiment of the positioning system 1, the system 1 is designed for rebuilding machinery. The tool 19 and spindle motor 20 selected for use in the system are dependent on the surface treatment of the machine being requalified. Grinding operations employ high speeds and low torques with fast feed rates to prevent heat damage that would occur if the tool 19 remained in one location or moved too slowly. Cutting or milling necessitates relatively slower spindle motor 20 speeds and higher torque with slower tool feed rates. While a variety of changeable machine tool platforms 25 can be used, preferred embodiments of the system have machine tool platforms 25 that optimize motor selection and machine rigidity. Similarly a wide range of motors is compatible with the system. Preferred embodiments of the present invention have spindle motors 20 with 1 to 10 horsepower, up to 75 ft.-lb. continuous torque, and a 4–8" diameter adjustable quill cartridge. One preferred embodiment uses brushless motors because of their high power in relatively small packages.

Since existing commercial heavy metalworking machines have diverse rail designs, the system 1 must be capable of carrying an assortment of tools 19. In addition to machining the actual bearing surfaces, rails 3 and guideways 5, repairing also requires maintaining a machined surface on the underside of the cross-section that serves as a hold-down 81 for the mating part or workbed. Remachining that section necessitates a tool configuration capable of reaching around and under the guideway 5. Preferred embodiments of the present invention 1 have tool platforms 35 capable of supporting a variety of tools 19 for requalification of the majority of guideways 5. Preferred embodiments of the system 1 have universal mounts 35 and an easily interchangeable set of tools 19 or entire motor 20/tool 19 assemblies.

Figure 2:
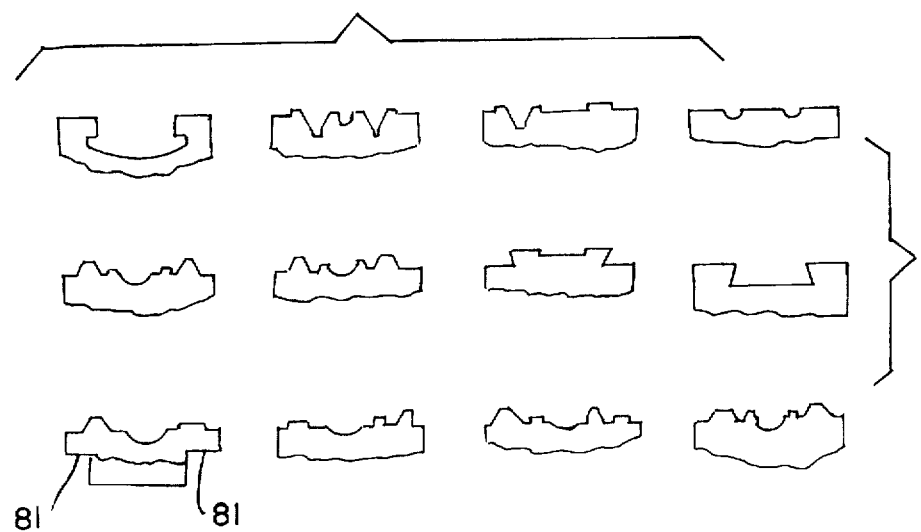
FIG. 2 shows typical cross-sections of rails and guideways in existing heavy machines.

The difficulty of regaining correct bearing and alignment of heavy machinery beds, rails and guideways is illustrated in FIG. 2, which shows many typical cross-sections of existing guideways which are candidates for requalification.

Figure 4:
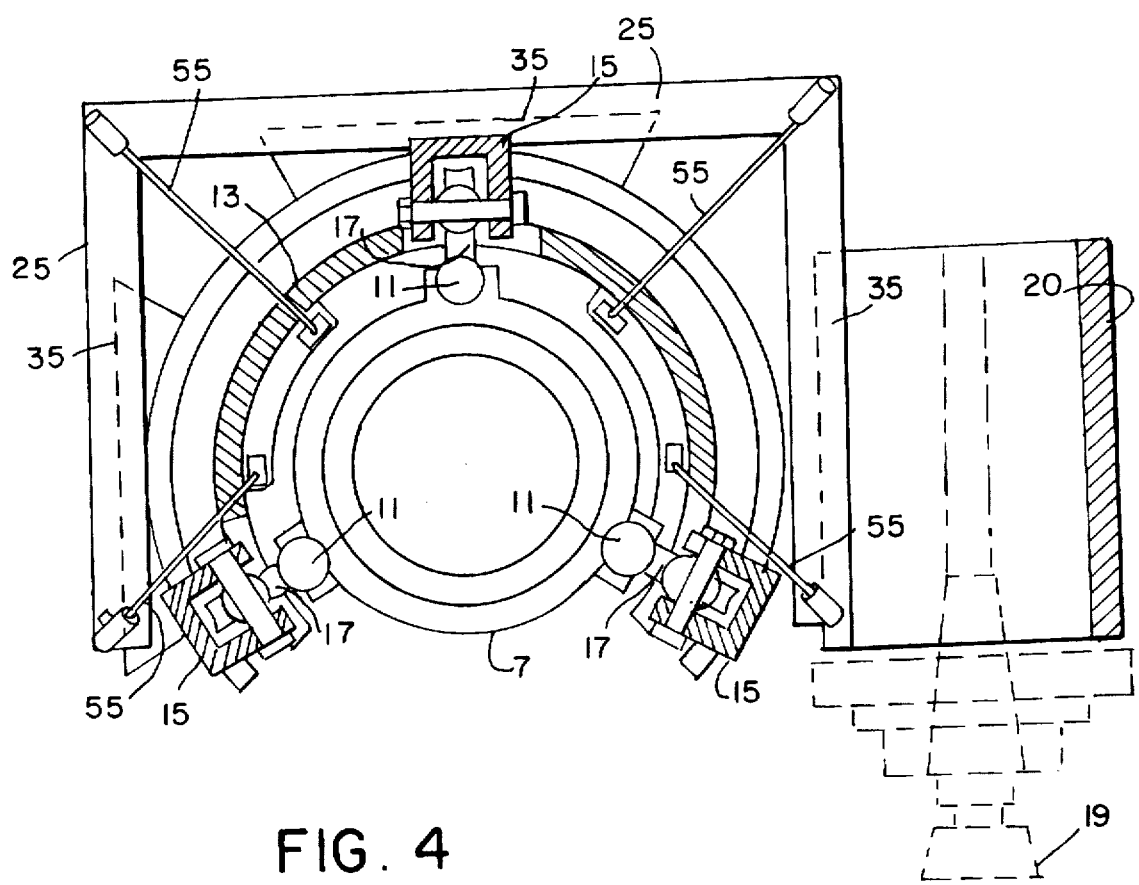
FIG. 4 is a cross-sectional view of a preferred embodiment of the monorail.
Figure 5:
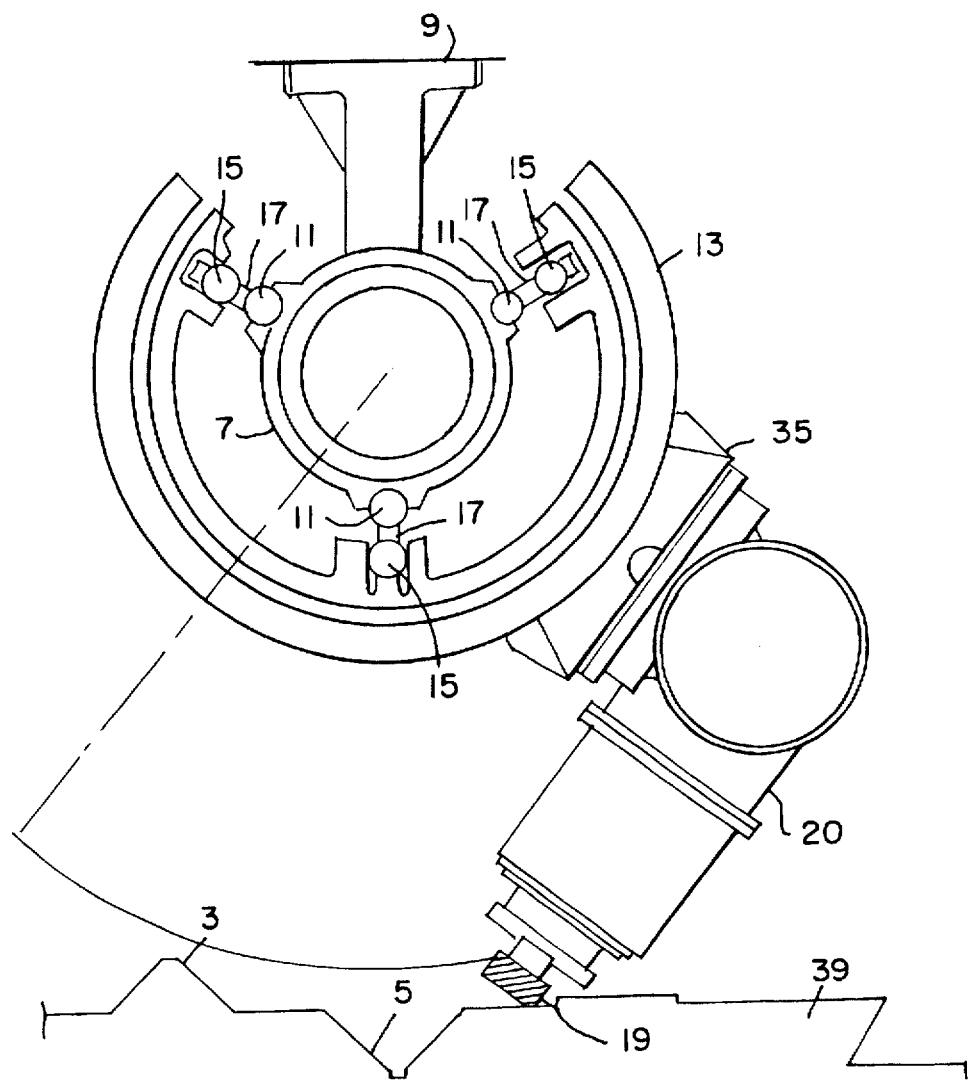
FIG. 5 schematically shows an embodiment of the present invention, showing the positioning of the monorail and tool in relation to the workpiece.
Figure 6:
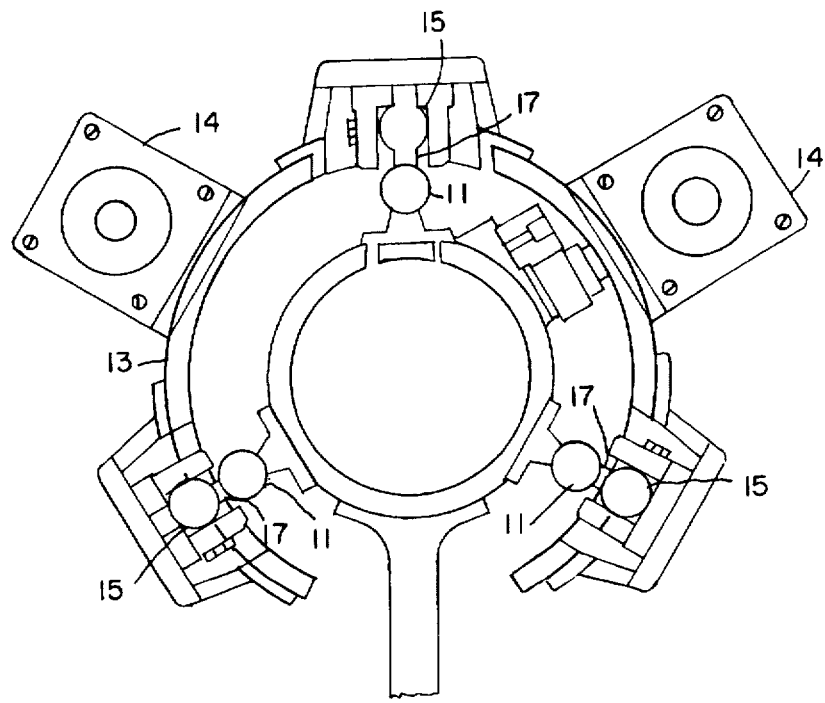
FIG. 6 schematically shows embodiment of the present invention having a monorail frame.

FIGS. 4, 5 and 6 show cross-sectional views of preferred systems 1 having a monorail frame 7, guide rails 11, a carriage as the movable base 13, a universal mount 35, an arrangement of variable length members (i.e., Variable Geometry Truss, V.G.T.) 55, a machine tool platform 25, linear bearings 15 with rollers 17 and a tool 19.

One subassembly of the present invention is the sectioned, monorail frame 7. The monorail frame 7 supports lateral motion and provides an accurate, seamless tool path nearly parallel to the work. The monorail frame 7 offers a compact track for the resurfacing tools 19 capable of being employed in diverse machining situations of limited space. Preferred embodiments of the present invention 1 have a monorail frame 7 of essentially circular cross-section and a length that allows for easy transportation. Tubular components are optimal because they are easily machined to precise tolerances. Sections of the monorail frame 7 may be fitted together by telescoping extended inner tubular sections within outer tubular sections. Preferred embodiments have sections of the monorail frame 7 fitted together through integrated cam-type locking mechanisms.

The projected use of the positioning system 1 determines the tool 19 the system 1 carries. Tools for drilling, heat treating, brazing and welding are all compatible with the present invention 1. Apparatus for applications including rail transport, micromachining, laser machining, material deposition, rapid prototyping and inspection camera positioning are also easily incorporated in the present system 1.

Figure 8A:
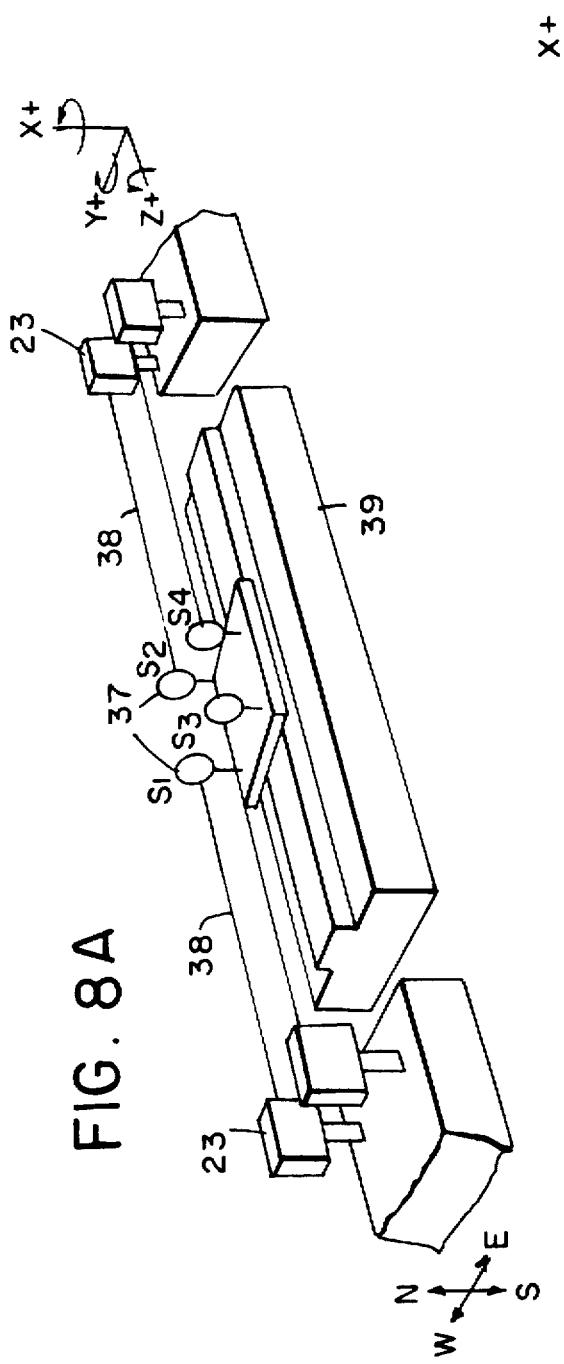
FIG. 8A shows schematically light source and detector placement for machine alignment.
Figure 8B:
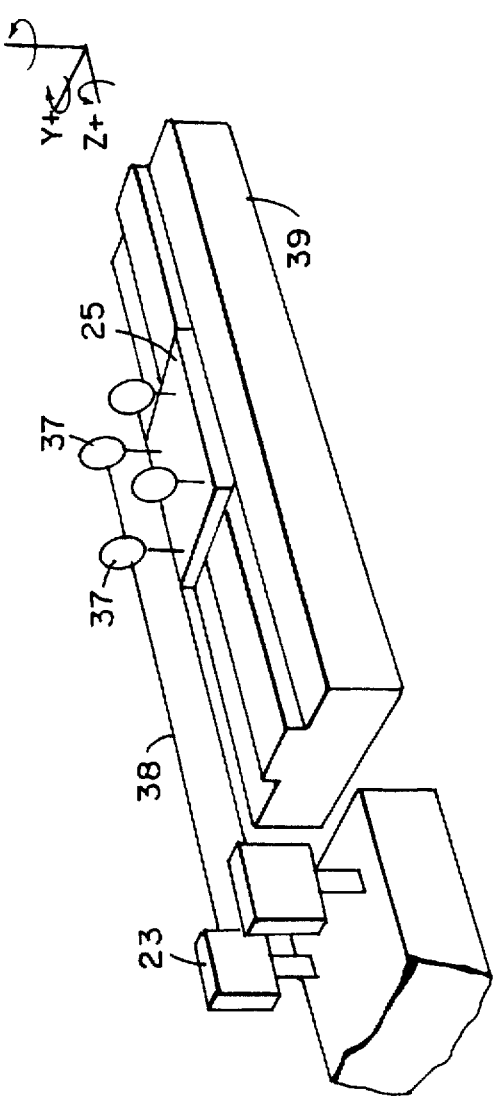
FIG. 8B shows light source and detector placement using semi-transparent detectors which are currently under development.
Figures 1, 14A:
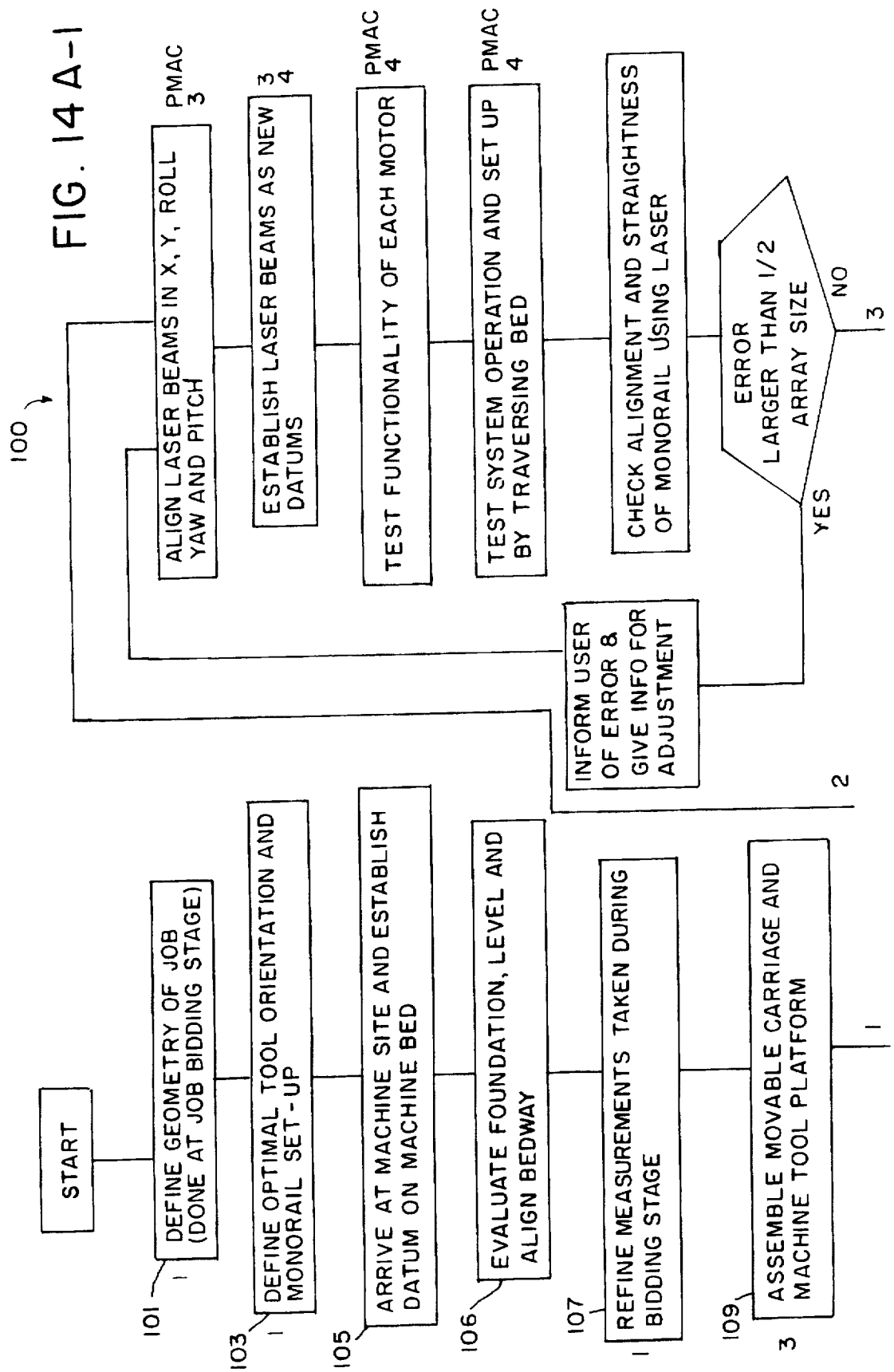
FIGS. 14A, 14B and 14C are flowcharts of the operation of the present invention.
Figures 2, 14A:
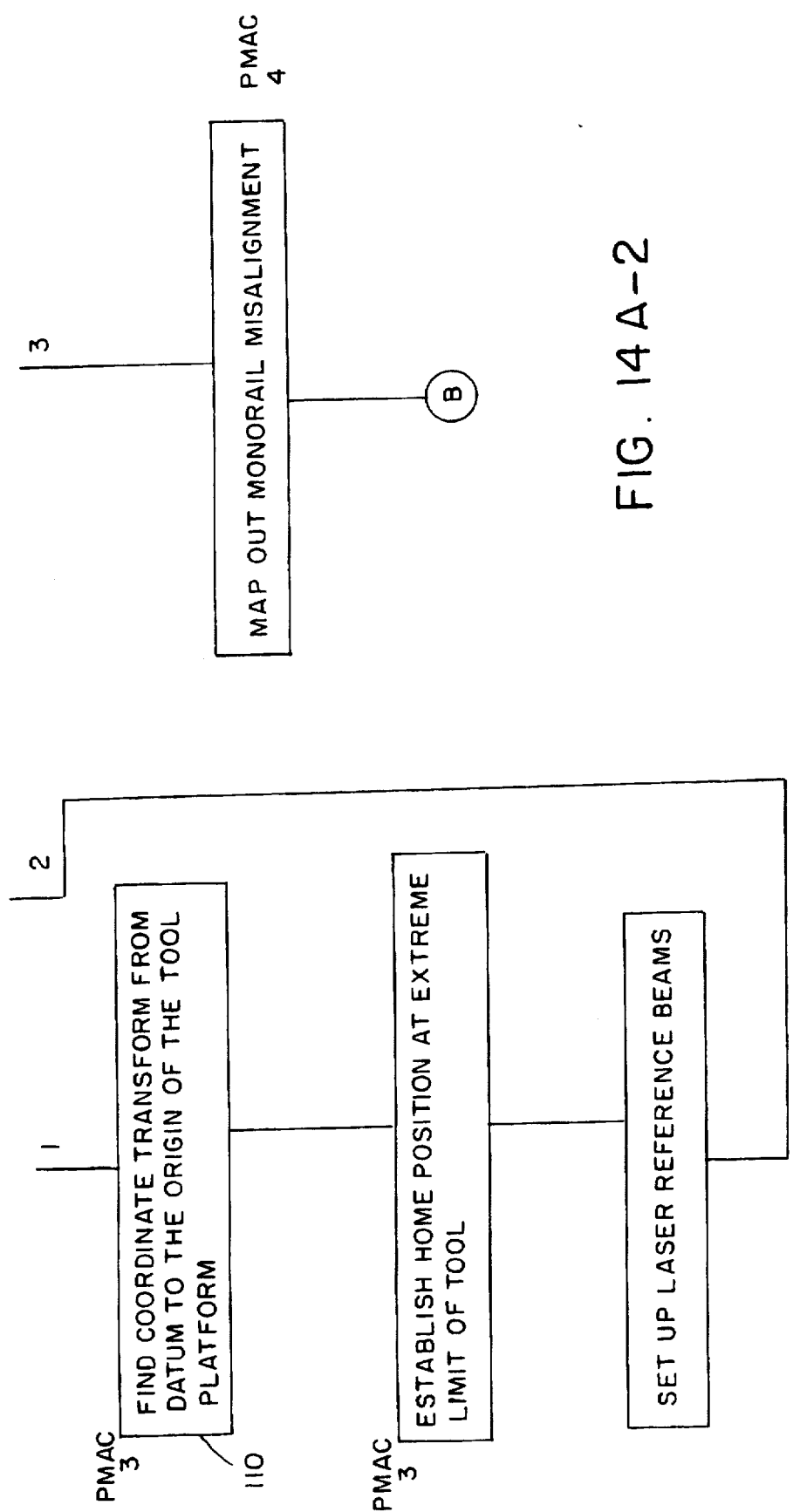

Position feedback is crucial in all phases of the positioning operation, and must be precise, accurate, rugged and reliable. In preferred embodiments of the system 1, three laser beams 38 on two parallel paths are used to resolve displacement in five axes. A fourth laser beam 38 provides redundancy in the event of laser failure, beam path blockage, or conflicting detector information. FIGS. 1, 8(a) and 8(b) show possible configurations. Light sources 23 are mounted remote from the monorail and/or machine bed. The detectors 37 are located far enough from the tool 19 to avoid interference from metal chips during the cutting process. Preferred embodiments of the present invention 1 have miniature lasers or laser diodes as light sources 23. Four light sources 23 are positioned at the ends of the machine bed 39. The light sources 23 serve to reference the surface to be machined. The arrangement of the detectors serves to resolve 3 axes of rotation and two axes of translation. Possible detectors 37 include, but are not limited to, CCD arrays, photodetector arrays, and quadrants. Positional information for all the axes except the longitudinal traversal is provided by the geometry of four light sources 23 and four detectors 37. The translational or Z-axis, in direction of machine travel, is measured by a separate laser through triangulation, Michelson interferometry, or optical position encoders. Alternatively, Z-axis position sensing can be performed by linear encoders or drive axis servo-positioning. Accelerometers can also be incorporated for coarse control of the system.

Figure 11:
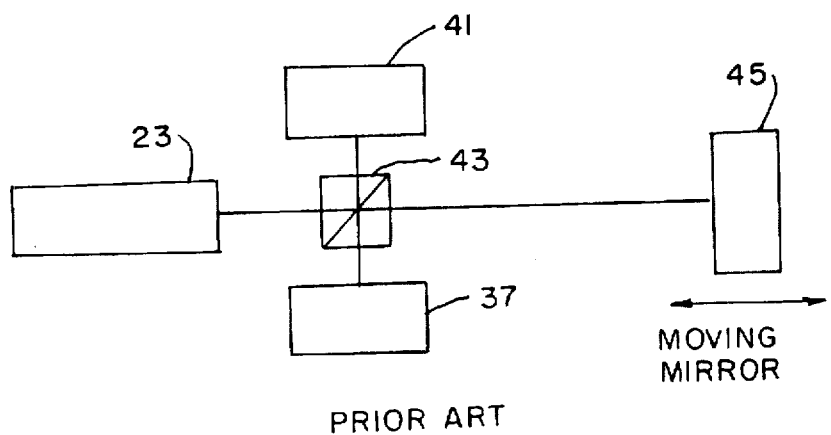
FIG. 11 is a block diagram of a Michelson interferometer.
Figure 12:
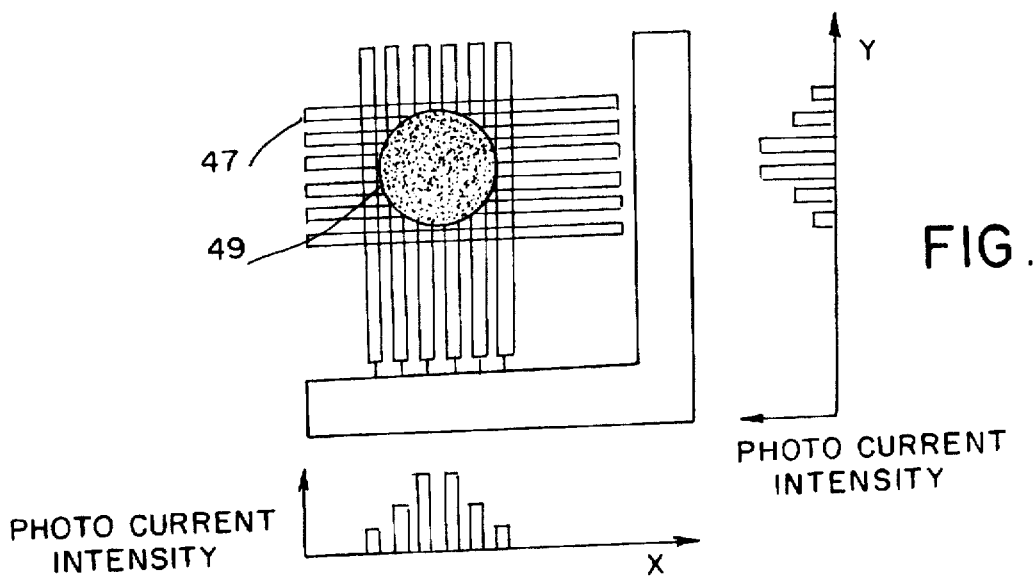
FIG. 12 shows the digital position sensitive detector technique for laser alignment.
Figure 13:
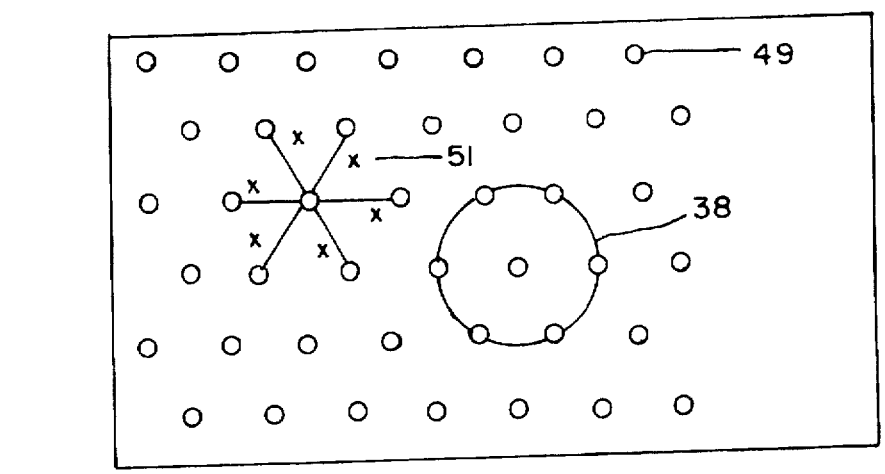
FIG. 13 shows a preferred pixel geometry for a detector array.

The laser alignment of system 1 has many options with respect to laser position sensing techniques. One technique uses quadrant sensing arrays. FIG. 10 illustrates the laser spot location technique using a four element array. The quadrant sensing technique is inexpensive, easy to set up and independent of environmental concerns. It has a small process requirement, but also provides low resolution and an extremely limited range of motion. A second technique uses a pixel array to resolve beam position on a grid of photodiodes as shown in FIG. 13. That technique is easy to set up, independent of environmental concerns and inexpensive. The pixel array technique has better resolution and is capable of measuring larger displacements than the quadrant array technique. Disadvantages of the pixel array technique include a high processor requirement and a resolution limited by pixel density. A third laser positioning technique, interferometry, measures distance by counting interference fringes from a reflected beam. Advantages of that technique are long range and resolution better than one micron. Disadvantages of interferometry include a very high update frequency requirement, limited range of angular motion, high cost and difficulties with set up. One must compensate for the environment and stabilize the beam, and can only resolve Z, pitch and yaw. FIG. 11 is a block illustration of a Michelson interferometer having a light source 23, a detector 37, a stationary mirror 41, a 50/50 beam splitter 43, and a moving mirror 45. The preferred technique, digital position sensitive detection, uses an array of stripes 47 to determine the centroid of the beam spot 49 in hardware, as shown in FIG. 12. This technique offers resolution of less than 1 micron, ease of set up, environmental stability, low cost, is capable of measuring large displacements, and processes position independently. The x-y position of the beam centroid is calculated from the relative photo-currents detected at the stripes. The arrangement of 3 detectors (or four for redundancy) as shown in FIG. 8(a) is then used as follows: The set of 3 x-y position pairs is reported to the laser positioning class in software which uses the known distances between the rigidly mounted detectors along with the x-y position data to calculate angular and linear displacements. FIG. 9 shows as an example the geometry which can be used with just two detectors to reslove pitch P. The pure pitch rotation shown in FIG. 9 would naturally yield zero x-translation (detectors perceive opposite sign, but equal magnitude of x-translation) as it should. The logic of FIG. 10 which shows the unique "signature" of each motion serves to illustrate how the known 4-detector geometry is used. FIG. 10 also demonstrates the redundancy of the fourth detector.

Using the detector/light source geometry as shown in FIG. 8(a) or 8(b), the light sources are mounted remote from both the monorail and the machine bed, or directly to the machine bed at the longitudinal ends. That provides a reference independent of monorail movement due to sag or vibration. The light sources are mounted such that from one end of the machine bed two parallel beams can be adjusted concomitantly in X, Y, roll, pitch and yaw. From the other end, the third beam can be similarly adjusted. That facilitates easy initial alignment for the user. FIG. 8(b) illustrates the relative simplicity which will be attained as semi-transparent detector technology becomes available. The semi-transparent detectors will eliminate the need for the user to align coincident beams as shown in FIGS. 8(a) and 9.

Figure 3:
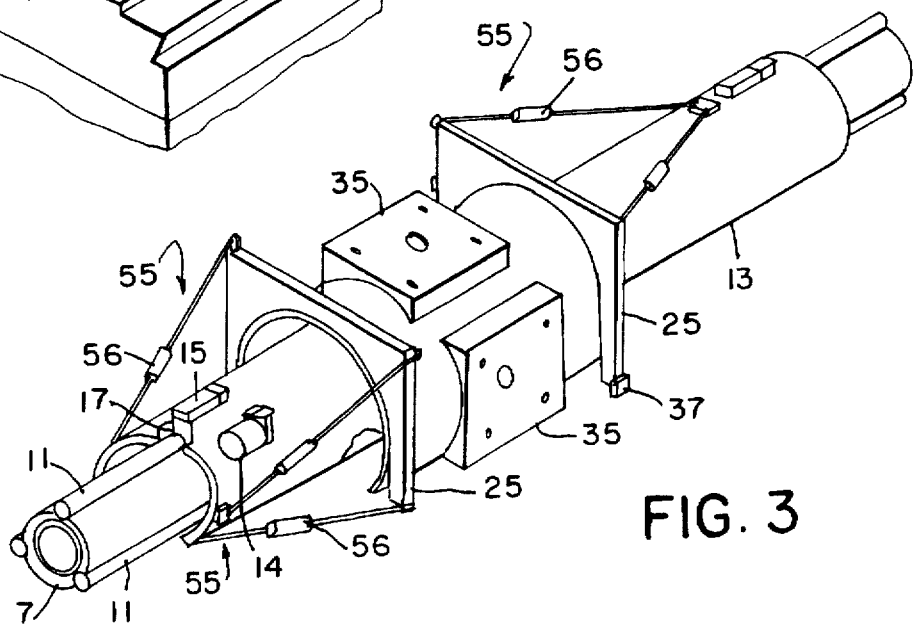
FIG. 3 shows a preferred embodiment of the present invention having elements for platform positioning.

Another subassembly of the present invention, a parallel platform tool positioner 27, makes small tool path corrections as a result of feedback from the laser alignment system. The positioner 27 controls motion in six axes for positioning the tool 19 and for correcting deviations from the cutting path. The lightweight design and easy set up of the portable machining system 1 creates the possibility of error as the monorail frame 7 sags under its own weight, flexes under the stresses and torque reactions of machining, and suffers from the carriage being aligned only roughly with the machine bed. To achieve compact, reliable machine motion control over a limited range in six axes, parallel platform robotic technology or variable geometry trusses (VGTs) 55 are used. An arrangement of variable length members (i.e. Variable Geometry Truss (V.G.T.)) 55 is a statically determinant truss in which some members are capable of changing length (variable length member, 56). Extensible links enable the truss 55 to alter its shape in a precise, controllable manner. The variable length members 56 of the arrangement 55 are loaded only in pure tension/compression, resulting in a manipulator with excellent stiffness and weight properties. A preferred embodiment of the machining system 1 implements VGT technology 55 as shown in FIG. 3. Variable length members 56 extend from both sides of the machine tool platform 25 to a movable carriage 13. The carriage 13 can be a sled that travels on a monorail frame 7 positioned over the machine bed and is motored by a carriage drive 14. That geometry provides maximum rigidity to the system 1. Preferred operational characteristics include a VGT truss envelope of +/–1" in x, y, z, an actuator speed of 2"/second, actuator resolution of 0.000050", and a carriage speed of 1–20"/minute variable. As shown in FIG. 3 three universal mounts 35 are mounted on the machine tool platform 25 which is spaced from the carriage 13 by variable length members 56. Six variable length members 56 support the machine tool platform 25. Five variable length members 56 are shown by way of example in FIG. 3. FIG. 1 shows connection of other variable length members 56 in phantom lines.

Figure 14B:
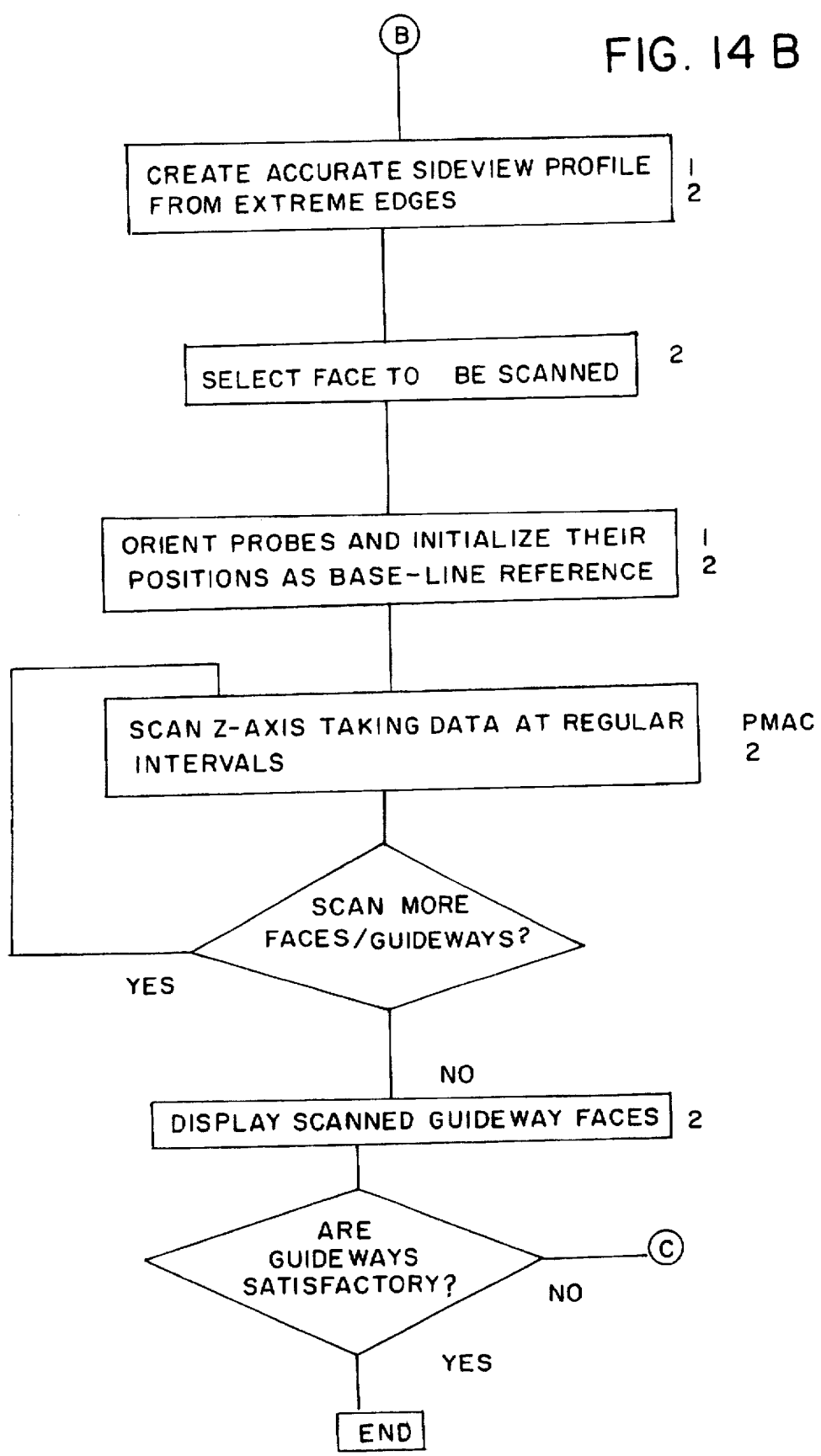
Figure 14C:
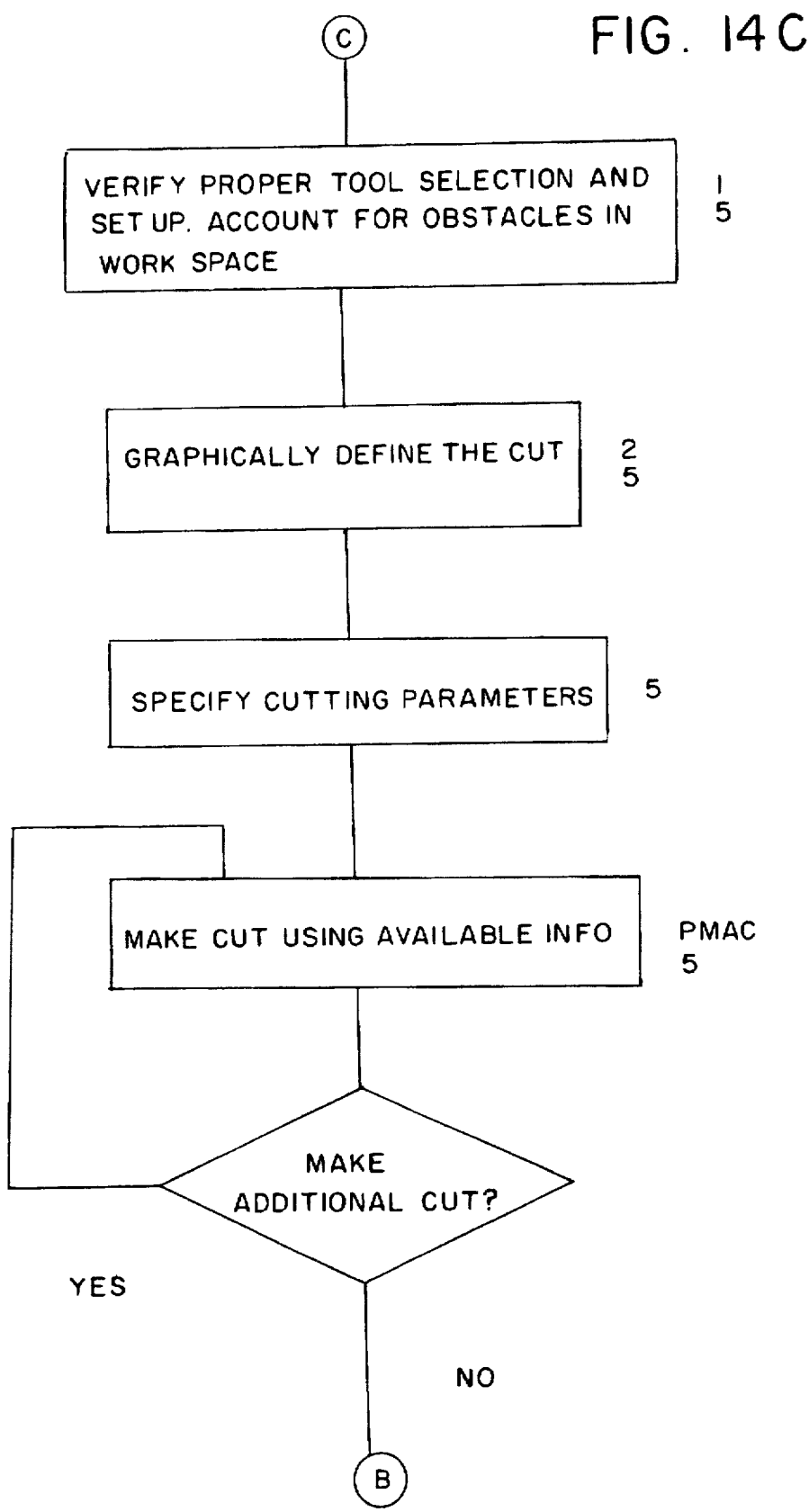

Each step in the operation of the laser aligned robotic positioning system 1 is supervised by the intelligent controller 31 implemented in software. That control is separated into five classes: the geometry definition class 112, the imaging class 114, the laser pre-alignment class 116, the laser positioning class 118, and the milling class 120. FIGS. 14A, 14B and 14C are a flowchart 100 of the system 1, noting which steps each class controls.

The purpose of the geometry definition class 112 is to allow preplanning of monorail placement, tool selection and cutter orientation 103. That class is a stand alone unit that the machinist can use in order to develop an accurate bid for the particular job. The unit stores information about the machines, the total job process, geometry of the machine surfaces, any notes about monorail setup and placement, cutting tool type and cutting tool orientation. Personal observations about the job site or any other relevant information can be stored by the unit, and the data are revisable 107. The movable carriage 13 and machine tool platform 25 are then assembled 109.

The imaging class 114 is responsible for gathering the data about the surfaces to be machined. As the data are being gathered, they are displayed in real time on a 3-D plot. That acquired data, along with data from the bidding process unit in the geometry definition class 112, is used to display initial views of the machine being requalified.

A third class, the laser pre-alignment class 116, controls movement of the machine tool platform 25 without assistance from the the laser positioning class 118. That pre-alignment unit first tests the functionality of each motor and actuator. The motors are moved by using data acquired from the velocity encoders on each variable length member 56. The data are stored internally to the laser pre-alignment class. Once functionality has been verified, control is passed to the laser positioning class 118 for further verification of the alignment of the monorail 7, and verification of actuator functionality.

The laser positioning class 118 is responsible for reading data from the positioning detectors 37 and converting the data to motion commands for the system. Inverse kinematics that are defined internally to derive a new platform position from the current platform position are used.

The milling class 120 activates the spindle 20 and begins workpiece machining. In this unit, a user defines the cutting plane with the aid of statistical analysis of the data produced by the imaging class 114. Once the cutting plane is defined, the cutting process begins. The milling class 120 and laser positioning class 118 work together to monitor the cutting process and correct for any anomalies. The milling class displays the machine tool platform 25 position and progress as well as the orientation of the tool 19 graphically as a means of user feedback. Numerical feedback is also given to the user. Built in failsafes prevent the milling class 120 from causing damage to the machine tool or to the surface being requalified.

Multiple low-level units are incorporated into the five main classes. A detector alignment unit is used by the laser pre-alignment class 116 and the laser positioning class 118 for displaying current detector information on the screen as well as instructions for correction of detector misalignment. Audible signals are also used to assist in the alignment of the light sources 23 and detectors 37. The graphics display unit is used by the imaging class 114, the laser positioning class 118 and the milling class 120 for generation of 2-D and 3-D images. For all 3-D images, basic graphics transformations such as scaling, rotation and viewpoint adjustment are implemented. The graphics display unit allows a user to define a given section of the whole picture to be scaled and to eliminate erroneous or unnecessary datapoints. The file i/o unit is used by the geometry definition class 112, imaging class 114 and milling class 120 for saving and retrieving data to and from secondary storage. The user i/o unit is used by all five of the main classes for interactive communication between the system and the user. The statistics unit is used by the imaging class 114 and the milling class 120 for supplying various levels of statistical analysis to the user. The statistics are used for cut planning and error detection. The expert unit is used by the milling class and consists of fuzzy logic algorithms to reduce chatter during machining and to select feed rates and spindle speeds. The rule base is derived from machinists' experience and standard references.

Figure 15:
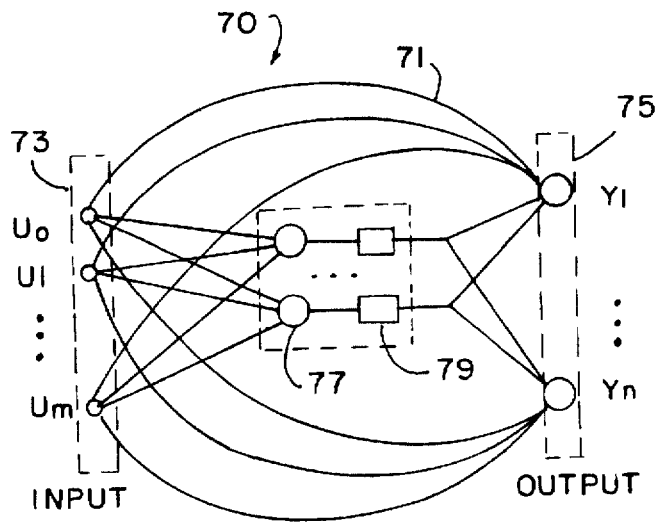
FIG. 15 schematically shows connection of processing elements to form a neural network.

Neural networks may be trained and implemented to hold the information relevant the rule base of the expert system. The basic building block of an Artificial Neural Network (ANN) 70, as shown in FIG. 15, is the artificial neuron or processing element 71. Processing elements are arranged in layers and are interconnected to form the neural network. Each element processes the input 73 it receives from other elements and provides a continuous analog value to other elements via its output connections 75. That processing typically involves a two part operation. First, a summation 77 of the incoming signals from other neurons, weighted by the strength of connection between the neurons, is performed. Second, the sum is passed through a transfer or squashing function 79. Typical transfer functions include the hyperbolic tangent and the sigmoid. The processing elements are connected to form a neural network 70 as illustrated in FIG. 15. The neural network is characterized by its learning process into three categories: supervised learning networks where the input and output patterns are presented to the network; unsupervised learning, where the network is presented only with the input pattern and the network is asked to self-organize; and reinforcement learning where the network learns from information on the effect of a specific input. The direction of the flow in the neural network determines whether the network is feedforward or bidirectional.

Figure 16:
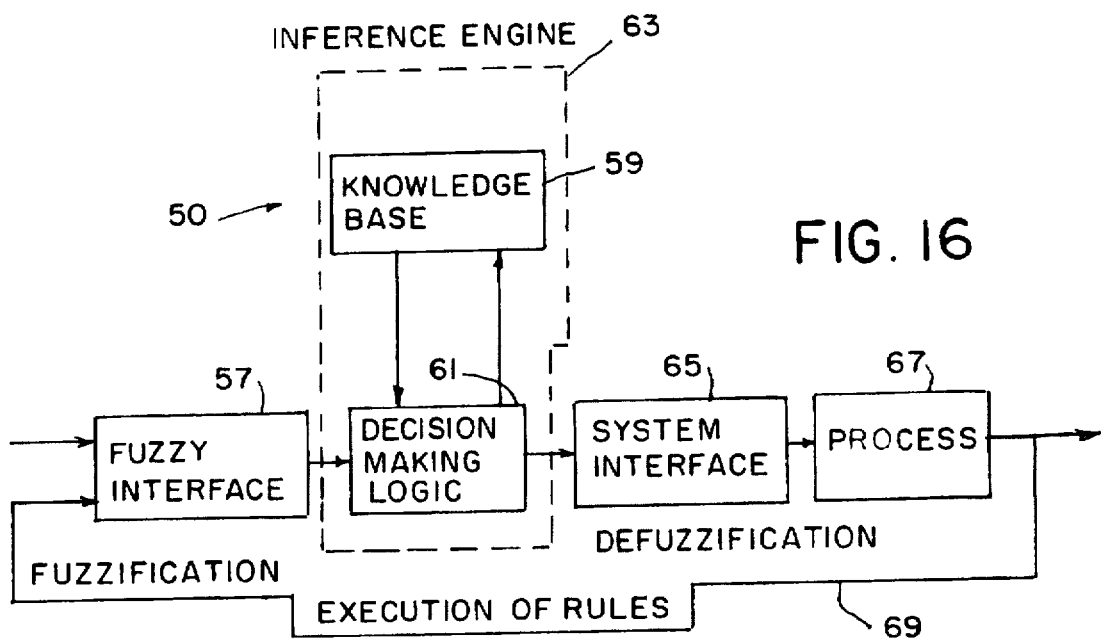
FIG. 16 is a schematic illustration of a fuzzy logic controller.

FIG. 16 is an illustration of a Fuzzy Logic Controller (FLC) 50. A FLC 50 converts expert knowledge into an automatic control strategy without a detailed knowledge of the system. FLC 50 has three components: the fuzzification interface 57, the knowledge base 59 and decision making logic 61 that comprise the inference engine 63, and the defuzzification system interface 65. The input to the FLC 50 is processed by the fuzzification interface 57, converting the input to the fuzzy set domain. The domain is processed by the fuzzy inference engine 63 using: if <condition> then <implication> rules, and a fuzzy output is obtained depending on how much each rule is applicable. The output is in turn defuzzified, or converted back into a number in the real domain that is used as the control input to the process 67.

A supervisor platform 29 incorporating intelligent control, another subassembly of the system 1, monitors system behavior, predicts and detects chatter, and modifies actuator tuning parameters in response to dynamic forces as predicted by the expert system. The multi-axis motion controller 31 gives fast response with minimal overshoot.

Chatter in machine resurfacing occurs because of resonant phenomena between the spindle oscillation, the natural frequency of the metal to be resurfaced, and the natural frequency of the support structure. To solve that problem, the system natural frequencies are identified using linear system techniques and/or neural network identification techniques. Next, an adaptive fuzzy expert system uses real-world machinists' knowledge to control chatter.

After the surface is machined, it is rescanned to document the surface quality of the requalified guideway. Data acquired from this stage are stored in a database and may be used to improve control strategy.

A final subassembly is the imaging sensor system 33. Imaging sensor hardware consists of a laser array, mechanical probe array, or eddy current sensing, depending on the suitability of the environment. For a typical 4-inch wide guideway face 5, three equally spaced probes, sampling approximately every half inch, give an acceptable profile mapping of the guideway 5. The sensors are incorporated in the machine tool platform 25 on a removable or retractable arm for use twice in a typical machining operation: first for mapping the surface, and second after the final machining pass as verification of the requalifying effort.

The requalifying effort of the proposed technique is now summarized, with a more detailed synopsis to follow: After assembling multiple monorail frame 7 sections, making an initial traversal of the machine bed with the carriage 13 allows aligning of the tool 19 with light sources 23 and detectors 37. The machine bed is traversed a second time to scan the bed to be machined. Next, the bed is machined. After machining is completed, the bed is traversed a final time to verify the accuracy of the machining process.

When the system 1 is first set up in a new location, initial alignment is performed to ensure alignment of beams 38 with the machine tool platform 25. Having the X and Y axes define the plane perpendicular to the machine tool platform 25 line of travel, the angle of rotation about X, Y and Z is initialized to zero relative to the detector arrangement beginning with a relatively rough estimate made by the operator. The carriage 13 is then sent down the monorail 7. The multi-axis motion controller 31 provides feedback with specific information about any misalignments and verification that the beams 38 remain within the limits of the detectors 37. That initial pass along the monorail frame 7 also serves as a general check of proper installation.

Once the laser aligned positioning system 1 has been set up and precisely aligned by the operator using the laser pre-alignment class 116 and prompts from the multi-axis motion controller 31, the surfaces to be machined are scanned. All guideways 5 of the machine bed 39 are scanned and mapped prior to any machining operation to plan an optimal material removal strategy. The operator is prompted to override exception data in the software scan, allowing holes, gouges or other anomalies to be treated separately. Software algorithms, using the pre-machining image, plan tool 19 motion and determine the minimum amount of material to be removed to restore the guideway 5. That minimization takes into account the entire map and expert knowledge.

After machining is completed, a post-machining scan image of all faces of the guideway 5 is performed. That image serves to verify the quality of the refinished surface. A hard copy of the image screen is created, providing the user with documentation of machine quality improvements required for ISO 9000 and other quality management programs.

While the invention has been described with reference to specific embodiments, modifications and variations of the invention may be constructed without departing from the scope of the invention, which is defined in the following claims.

We claim:

1. A precision positioning system for machinery comprising a monorail frame, multiple guides extending along an outer surface of the monorail frame, supports for holding the monorail frame in position, a movable base surrounding the monorail frame, multiple linear bearings positioned in the base for moving the base along the monorail frame, a machine tool head connected to the movable base, a tool platform positioned on the machine tool head, a tool mounted on the platform, a laser alignment system mounted to the movable base for positioning the tool, a parallel platform system connected to the movable base and to the tool for adjusting tool movement, an imaging system for mapping the guideway, and an intelligent controller for monitoring system behavior, for predicting and detecting chatter and for regulating frame deflections and platform positioning.

2. The system of claim 1, wherein the monorail frame is tubular and has a circular cross-section.

3. The apparatus of claim 1, further comprising multiple monorail frames connected together by integrated cam-type locking mechanisms for creating a lateral tool path parallel to the guideway.

4. The apparatus of claim 1, further comprising a motor connected to the tool for supplying power, and wherein the tool and the motor are adjustably and removably mounted on the tool platform.

5. The apparatus of claim 1, wherein the imaging system further comprises imaging sensors positioned in the tool platform.

6. The apparatus of claim 5, wherein the sensors are selected from the group consisting of a laser array, a mechanical probe array, and eddy current sensing.

7. The apparatus of claim 5, further comprising a movable arm connected to the tool platform and wherein the imaging sensors are positioned on the movable arm.

8. The apparatus of claim 7, wherein the movable arm is a retractable arm.

9. The apparatus of claim 1, wherein the laser alignment system is an arrangement of light sources and detectors for providing information in five axes of motion.

10. The apparatus of claim 9, wherein the light sources are selected from the group consisting of miniature lasers and laser diodes.

11. The apparatus of claim 9, wherein the detectors are selected from the group consisting of CCD arrays, photodetector arrays and quadrants.

12. The apparatus of claim 9, wherein the detectors are mounted to the machine tool head and the light sources are positioned at ends of a machinery bed.

13. The apparatus of claim 12, wherein the detectors are mounted and the light sources positioned for allowing beams emitted from the light sources and received by the detectors to be parallel or nearly parallel to the workpiece and off axis.

14. The apparatus of claim 13, wherein the light sources are adjustably mounted to allow rotation about a tool spin axis and a horizontal twist axis.

15. The apparatus of claim 13, further comprising a separate sensor for determining position in the translational direction.

16. The apparatus of claim 9, further comprising accelerometers connected to the movable base of the tool for course control.

17. The apparatus of claim 9, wherein the detectors are positioned at ends of a machine bed and the light sources are mounted on the machine tool head.

18. The apparatus of claim 1, wherein the laser alignment system has a laser position detector selected from the group consisting of quadrant sensing arrays, pixel arrays, interferometry and digital position sensitive detection.

19. The apparatus of claim 1, wherein the parallel platform system comprises variable geometry trusses that extend from a left side and a right side of the machine tool head to the moveable base, the trusses reacting to feedback from the laser alignment system.

20. The apparatus of claim 1, wherein the moveable base is a sled.

21. The apparatus of claim 1, wherein the intelligent controller is a fuzzy logic controller having a fuzzification interface for processing input from the imaging system and the laser alignment system, a knowledge base and decision making logic, and a defuzzification interface.

22. A method for resurfacing heavy machinery guideways comprising the steps of assembling multiple monorail frame sections near a workpiece, making an initial traversal of the workpiece to align a machine tool with light sources, detectors and workpiece, traversing the workpiece a second time for scanning and imaging a surface of the workpiece, machining the surface of the workpiece, and traversing the workpiece a final time for imaging the surface of the workpiece to verify accuracy of the machining and for creating a hard copy of an image scan.

23. The method of heavy machinery in situ guideway rebuilding comprising defining geometry of a machine, defining optimal tool orientation, defining monorail set up, establishing datum on or near the ends of a heavy machine bed, refining measurements, assembling a monorail, assembling a carriage on the monorail, assembling a tool platform on the carriage, finding coordinate transforms from the datum to the origin of the tool platform, establishing home limit position at an extreme limit of the carriage, the tool platform and a tool, setting up laser reference beams, aligning laser beams in X and Y axes and in roll, yaw and pitch, establishing laser beams as new datums, testing functionality of drives on the carriage and the platform, testing system operation and set up by traversing the machine bed, checking alignment and straightness of the monorail using the laser reference beams, mapping monorail deflections, creating a side view profile from extreme edges, selecting guideway faces to be scanned, orienting probes and initializing their positions as a base line reference,.scanning guideway faces along a Z axis, taking data at regular intervals, and displaying and recording scanned guideway faces.

24. The method of claim 23, further comprising verifying correct tool selection and set up, accounting for obstacles in machining workspace, graphically defining machining of the guideway faces, specifying machining parameters, and machining the guideway faces.

25. A precision positioning system comprising a monorail frame, multiple guides extending along an outer surface of the monorail frame, supports for holding the monorail frame in position, a movable base surrounding the monorail frame, multiple linear bearings positioned in the base for moving the base along the monorail frame, a parallel platform system connected to the movable base, a laser alignment system mounted to the movable base, an imaging system for mapping the guideway, and an intelligent controller for monitoring system behavior, for predicting and detecting chatter and for regulating frame deflections and platform positioning.

26. A parallel platform system for achieving motion in six axes comprising a moveable platform, a left base, a right base, and six independent actuators, wherein three actuators are fixed to the left base and three actuators are fixed to the right base.

27. A laser alignment system for sensing orientation in five axes comprising three x-y position detectors and three beams, the detectors and beams resolving orientation in x, y, roll, pitch and yaw directions.

28. A precision positioning system for automatically resurfacing heavy machinery comprising a monorail frame, multiple guides extending along an outer surface of the monorail frame, supports for holding the monorail frame in position, a movable base surrounding the monorail frame, multiple linear bearings positioned in the base for moving the base along the monorail frame, a machine tool head connected to the movable base, a tool platform positioned on the machine tool head for mounting a machine tool, a machine tool mounted on the platform for grinding, cutting or milling a heavy machinery guideway, a motor connected to the tool for supplying power, a laser alignment system mounted to the movable base for positioning the machine tool, a parallel platform system connected to the movable base and to the machine tool for adjusting tool movement, an imaging system for mapping the guideway, and an intelligent controller for monitoring system behavior, for predicting and detecting chatter and for regulating frame deflections and platform positioning.

* * * * *